Patented Sept. 26, 1950

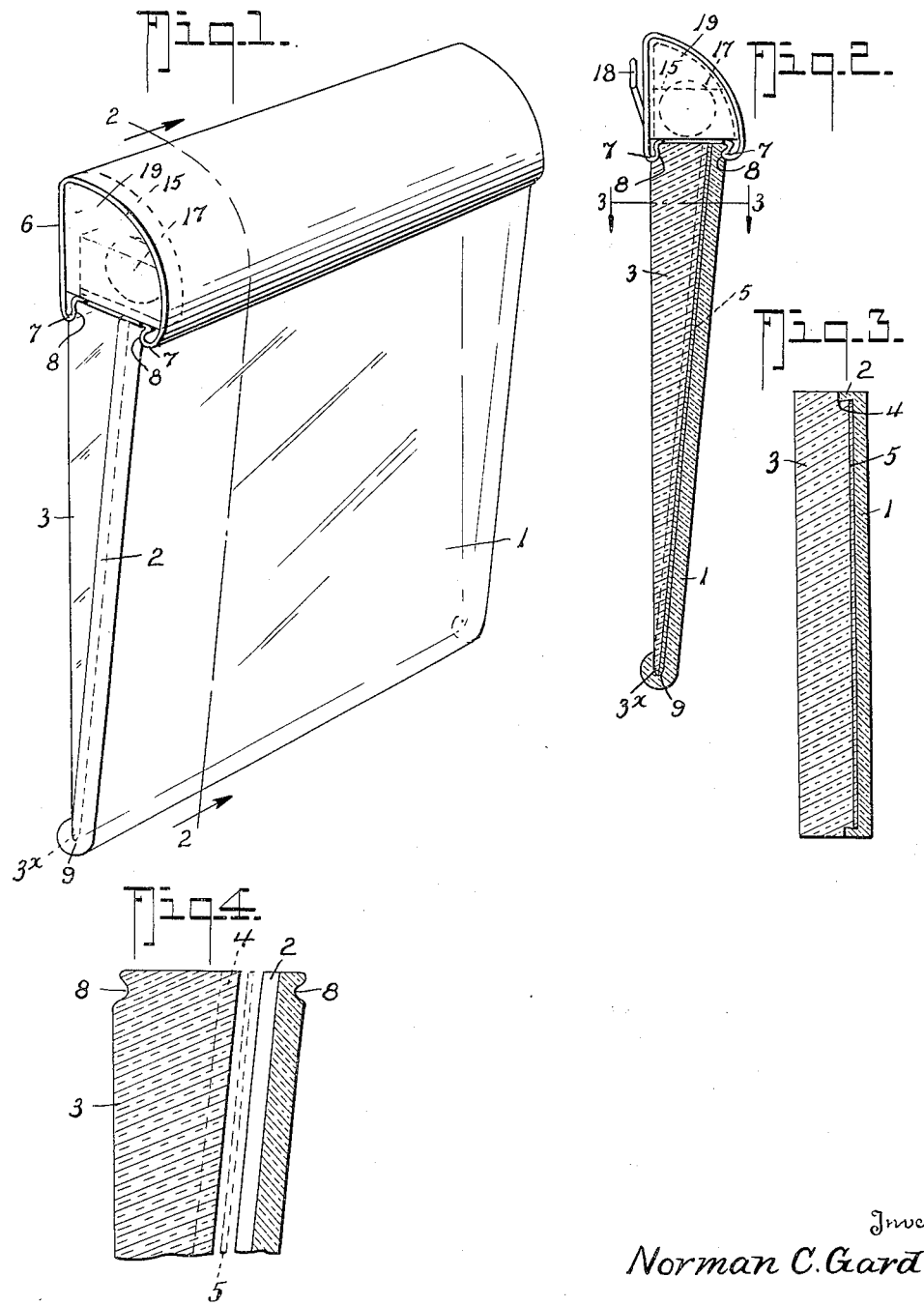

2,523,290

UNITED STATES PATENT OFFICE 2,523,290

ILLUMINATED PICTURE EXHIBITOR

Norman C. Gardner, Williamsport, Pa.

Application April 3, 1947, Serial No. 739,171

1 Claim. (Cl. 40—152.2)

My invention which relates generically to picture displaying means has for its objects:

1. To provide a simple, inexpensive means for illuminating and displaying the picture.
2. To provide a compact picture holder and display device.
3. To provide a means to display a picture in which the entire area of the picture is illuminated evenly throughout.
4. To provide a picture holder of the character stated in which provision is made for evenly distributing, disbursing, or diffusing light behind, through or onto the entire picture area.

Other objects will be obvious to those skilled in the art.

To the attainment of the aforesaid objects and ends, invention further resides in the novel details of construction, combinations and arrangements of parts all of which will first be described in detail and then be specifically pointed out in the appended claims reference being had to the accompanying drawing in which:

Fig. 1 is a perspective view of one embodiment of my invention, no picture being shown.

Fig. 2 is a vertical section of the same on the line 2—2 of Fig. 1 with a picture (negative or positive) in place.

Fig. 3 is a horizontal section on the line 3—3 of Fig. 2.

Fig. 4 is a detail vertical section of the plates 1 and 3 only, taken on the line 2—2 of Fig. 1.

In the drawing in which like numerals and letters of reference indicate like parts in all the figures, 1 is a flat front plate of glass or glass-like material such as Plexiglass or Lucite, the lower edge of which is beaded and grooved, as at 9, while the upper extremity has a groove 8 in its front face.

A back plate 3 of tapered or wedge-shape in side elevation has a groove 8 at its upper extremity in its rear face, the two grooves 8—8 serving as a convenient means for mounting the plates in a suitable support 6, which has beads 7 to fit into the grooves 8—8 when the device is set up.

The back plate 3 has its pointed edge 3× set in a recess or groove 9 in the beaded edge of plate 1, as best shown in Fig. 2. The back plate 3 also has longitudinal grooves in its sides which are disposed adjacent the front face of the plate 3 to receive the edge extensions 2 of the front plate 1.

The support 6 is of tubular form in cross section and contains a light source 17 of any approved, suitable kind and 15 is an end block of insulation for carrying the illuminant 17 as indicated in Fig. 2.

In assembling the device of Fig. 1 the plates 1 and 3 are slid out of the supporting shell 6 sidewise and plate 3 is detached from plate 1 as shown in Fig. 4. The picture 5 is then laid face against the back surface of plate 1 and plate 3 is slipped back with the flanges 2 in the grooves 4 as shown in Fig. 3. The assembled plates and picture are then slid back into the shell 6. To prevent light emission through the ends of shell 6, end caps 19 are fitted into the ends of the shell and held by retaining friction or in any other suitable way.

A suitable element 18 may be provided by means of which the device of Figs. 1 and 2 may be mounted on a wall or the like.

In practice the pictures to be displayed are preferably transparent ones. Further the plate of glass or glass-like material may be frosted, corrugated or beaded in any well known suitable way the better to diffuse, distribute or disburse the light behind the picture.

If it is desired to produce a three dimensional effect two identical pictures between which is placed a thin sheet of glass may be located between the plates 1 and 3 with the pictures in register.

From the foregoing description taken in connection with the accompanying drawing it is thought the construction, operation and advantages of my invention will be clear to those skilled in the art.

What I claim is:

An illuminated picture exhibitor comprising two plates of light conducting material, one of said plates at its bottom edge having a transverse bead with a groove to receive the bottom edge of the other plate, one of said plates having vertical side grooves and the other plate having side flanges to fit into said side grooves, both plates at their upper ends having transversely disposed grooves, a supporting shell of tubular form in cross section open at the bottom and provided with beads to fit said transversely disposed grooves of said plates and hold them together, a picture located between said plates and an illuminant mounted in said support, and a mounting element on said supporting shell.

NORMAN C. GARDNER.

REFERENCES CITED

The following references are of record in the file of this patent:

UNITED STATES PATENTS

| Number | Name | Date |
|---|---|---|
| 1,664,302 | Leopold et al. | Mar. 27, 1928 |
| 1,933,216 | Juhasz | Oct. 31, 1933 |
| 2,347,665 | Christensen et al. | May 2, 1944 |
| 2,361,479 | Jaffo | Oct. 31, 1944 |

FOREIGN PATENTS

| Number | Country | Date |
|---|---|---|
| 31,104 | France | Aug. 31, 1926 |
| 716,363 | France | Oct. 6, 1931 |